July 26, 1966 P. D. SENSTAD 3,262,325
CONTROL APPARATUS
Filed Sept. 18, 1962 4 Sheets-Sheet 1

INVENTOR.
PAUL D. SENSTAD
BY Roger W. Jensen
ATTORNEY

INVENTOR.
PAUL D. SENSTAD
BY Roger W. Jensen
ATTORNEY

July 26, 1966  P. D. SENSTAD  3,262,325
CONTROL APPARATUS
Filed Sept. 18, 1962  4 Sheets-Sheet 3

INVENTOR.
PAUL D. SENSTAD
BY Roger W. Jensen
ATTORNEY

July 26, 1966     P. D. SENSTAD     3,262,325
CONTROL APPARATUS

Filed Sept. 18, 1962                                    4 Sheets-Sheet 4

INVENTOR.
PAUL D. SENSTAD
BY Roger W. Jensen
ATTORNEY

United States Patent Office 3,262,325
Patented July 26, 1966

3,262,325
CONTROL APPARATUS
Paul D. Senstad, Golden Valley, Minn., assignor to
Honeywell Inc., a corporation of Delaware
Filed Sept. 18, 1962, Ser. No. 224,453
9 Claims. (Cl. 74—5)

This invention pertains to inertial instruments and more particularly to gyroscopes and accelerometers whose rotor or seismic mass is universally supported by means of electrostatic fields between said rotor and an array of electrodes arranged to envelop said rotor.

Various schemes have been developed to support an electrically conductive rotor of a gyro free of physical contact by means of electrostatic fields, however, to provide stable suspension, proper damping of the translations of the rotor is also necessary. One method used successfully has been to include an oil filled capacitor incorporating movable plates in the suspension loop. A disadvantage of this method is its additional power requirement due to operation of the damping capacitor at the high energy end of the system. Another disadvantage of this method is that the damping factor cannot be easily controlled or changed.

This invention teaches a novel and successful method of providing damping by means of a feedback signal. It is well known in the art that the voltage between the rotor and the electrodes is proportional to the separation distance of the electrode and the rotor and that the change in the voltage is directly proportional to the rotor displacement with respect to the electrodes. In this invention a portion of the electrode voltage is sampled by means of a coil, demodulated, and sent through a rate network. The rate proportional signal is used to control the gain of an amplifier whose output excites the suspension electrodes.

It is an object of this invention to provide a stable, electrostatic suspension for inertial instruments.

Another object of this invention is to limit the oscillations of electrostatically supported members by providing proper damping.

These and further objects of my invention will be apparent to those skilled in the art upon consideration of the accompanying specification, claims, and drawings of which:

Figure 1:
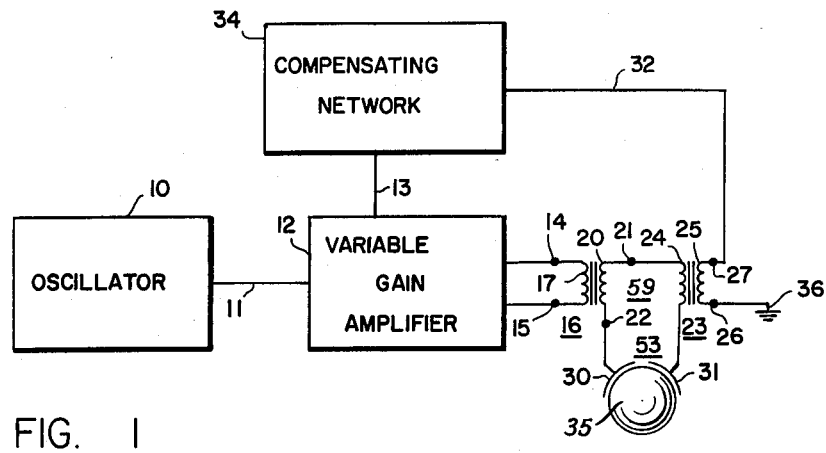
FIGURE 1 is a block diagram showing one channel of a resonant suspension system with a tickler coil and a compensating network according to the teaching of this invention.

Referring now to FIGURE 1 there is shown an oscillator 10 having an output 11 feeding into a variable gain amplifier 12. Output terminals 14 and 15 of variable gain amplifier 12 are connected to a primary winding 17 of a transformer 16. Transformer 16 further has a secondary winding 20 with terminals 21 and 22. Terminal 22 of winding 20 is connected directly to a rotor supporting electrode 30 and terminal 21 of winding 20 is connected through the primary winding 24 of a transformer 23 to a rotor supporting electrode 31. Rotor 35 provides a path for the electric field between support electrodes 30 and 31 and together with electrodes 30 and 31 and rotor 35 constitute a variable capacitive reactance, its magnitude depending upon the position of rotor 35.

Transformer 23 further has a secondary winding 25 with terminals 26 and 27. Terminal 27 of winding 25 is connected to a compensating network 34 by means of a connector 32. Terminal 26 of winding 25 is connected directly to ground 36. Compensating network 34 further has an output 13 directly connected to variable gain amplifier 12.

Figure 2:
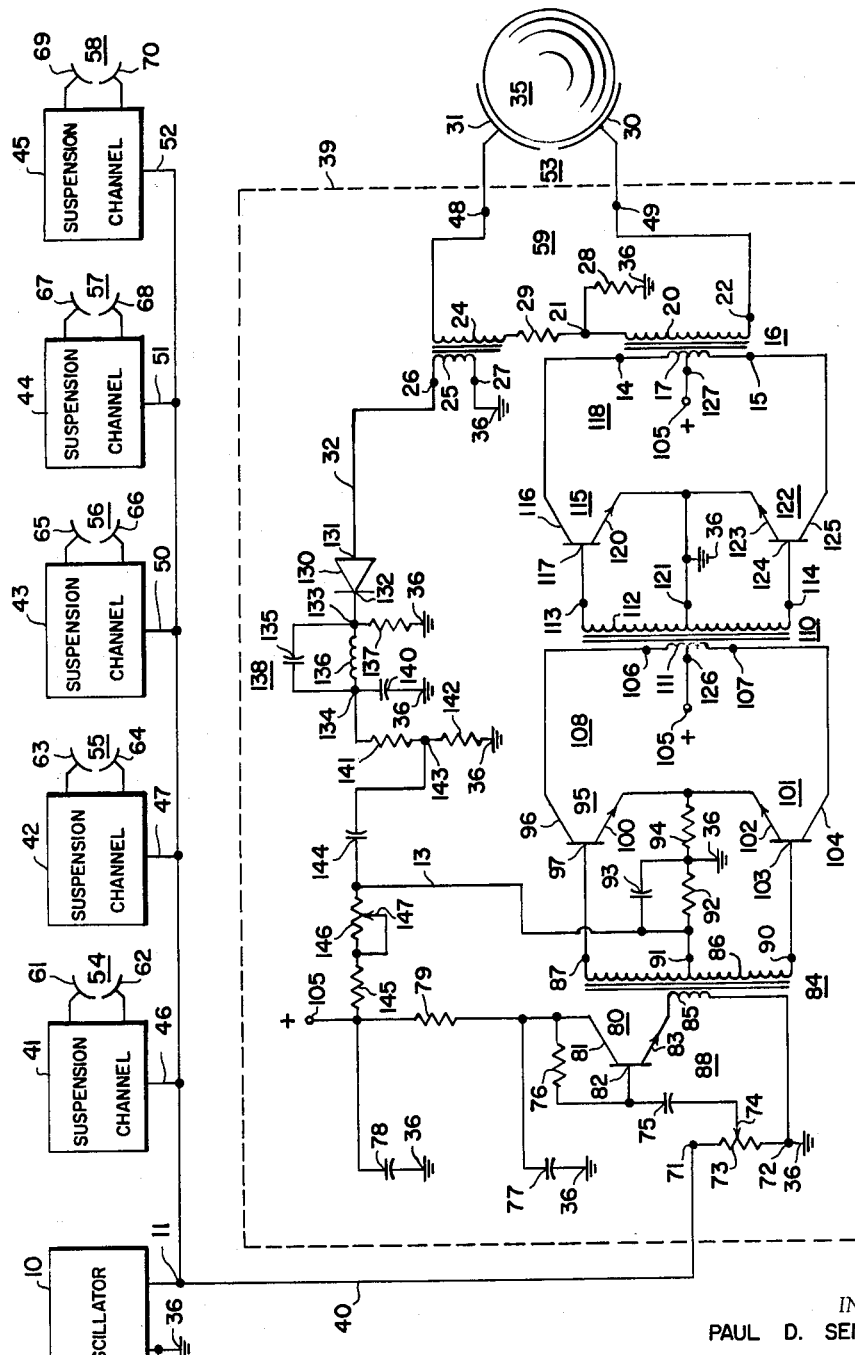
FIGURE 2 is a schematic diagram showing in detail one channel of the support electronics of the resonant suspension system with the tickler coil and the compensating network to provide damping through feedback.

In FIGURE 2, oscillator 10 has two output terminals 38 and 11. Output 38 is connected directly to ground 36. Output terminal 11 of oscillator 10 is connected to a suspension channel 39 at terminal 71 of a potentiometer 73 by means of a conductor 40. Potentiometer 73 further has a terminal 72 connected directly to ground 36 and a wiper 74 which is connected to base 82 of a transistor 80 through a capacitor 75. Transistor 80 further has a collector 81 and an emitter 83. Collector 81 is connected to a positive potential source 105 through a resistor 79 and to base 82 of transistor 80 through a resistor 76. Collector 81 of transistor 80 is further connected to ground 36 through a capacitor 77. The emitter 83 of transistor 80 is connected to ground 36 through the primary winding 85 of a transformer 84. Transformer 84 further has a secondary winding 86 with end terminals 87 and 90 and center tap 91. Terminal 87 of the secondary winding 84 is connected directly to the base 97 of a transistor 95. Transistor 95 further has a collector 96 and an emitter 100. Terminal 90 of secondary winding 86 is connected to the base 103 of a transistor 101. Transistor 101 also has a collector 104 and an emitter 102. Emitter 100 of transistor 95 and emitter 102 of transistor 101 are connected to center tap 91 of transformer 84 through a resistor 94 in series with a parallel combination of a resistor 92 and a capacitor 93. The center tap 91 of secondary winding 86 is further connected to a positive potential through a lead 13 (previously identified as the output of the compensating network) and a resistor 145 and a variable resistor 146 which includes a wiper 147. Collector 96 of transistor 95 is connected directly to a terminal 106 and one end of primary winding 111 of a transformer 110 while collector 104 of transistor 101 is directly connected to a terminal 107 on the other end of primary winding 111 of transformer 110. Primary winding 111 of transformer 110 further has a center tap 126 connected directly to positive potential 105. Transformer 110 also has a secondary winding 112 with end terminals 113 and 114 and a center tap 121.

Terminal 113 of secondary winding 112 is connected to the base 117 of a transistor 115. Transistor 115 further has a collector 116 and an emitter 120. Terminal 114 of the secondary winding 112 is connected to the base 124 of a transistor 122. Transistor 122 also has a collector 125 and an emitter 123. Center tap 121 of the secondary winding 112 is connected directly to ground 36. The emitter 120 of transistor 115 is connected directly to the emitter 123 of transistor 122 and also to ground 36. Collector 116 of transistor 115 is connected to one end or terminal 14 of the primary winding 17 of transformer 16. Collector 125 of transistor 122 is connected to the other end or terminal 15 of primary winding 17. A center tap 127 of primary winding 17 is connected directly to the positive potential 105. Transformer 16 further has a secondary winding 20 with terminals 21 and 22. Terminal 21 is connected to ground 36 through a resistor 28 and to an output 48 or variable gain amplifier 39 through a resistor 29 in series with the primary winding 24 of transformer 23. Terminal 22 of secondary winding 20 is connected directly to an output terminal 49 of suspension channel 39. Output terminal 48 is connected to electrode 31 and output terminal 49 is connected to electrode 30. Electrodes 30 and 31 form a pair of electrodes 53 having their areas facing rotor 35. Together with rotor 35 electrodes 31 and 30 constitute a variable capacitive reactance, its magnitude depending upon the position of rotor 35.

Transformer 23 further has a secondary winding 25 with terminals 26 and 27. Terminal 27 of secondary winding 25 is connected directly to ground 36 and terminal 26 of the secondary winding 25 is connected by means of conductor 32 to the anode 131 of a diode 130. Diode 130 further has a cathode 132 directly connected to an input terminal 133 of a filter 138. Filter 138 further has an output terminal 134. Input terminal 133 of filter 138 is connected to ground 36 through a resistor 137 and to the output terminal 134 through an inductor 136 in parallel with a capacitor 135. Output terminal 134 of filter 138 is connected to ground through a capacitor 140 and to terminal 135 through resistor 141. Terminal 143 is connected to ground 36 through resistor 142 and to center tap 91 of the secondary winding 86 of transformer 84 through differentiating capacitor 144 and conductor 13.

The output 37 of oscillator 10 is also connected to inputs 46, 47, 50, 51 and 52 of suspension channels 41, 42, 43, 44 and 45, respectively. All suspension channels 41–45 are identical to the suspension channel 39 and each channel is energizing a pair of electrodes. More specifically channels 41–45 have associated therewith respectively the following pairs of electrodes 54–58 which in turn are comprised of individual electrodes 61–62, 63–64, 65–66, 67–68, and 69–70, respectively.

Figure 3:
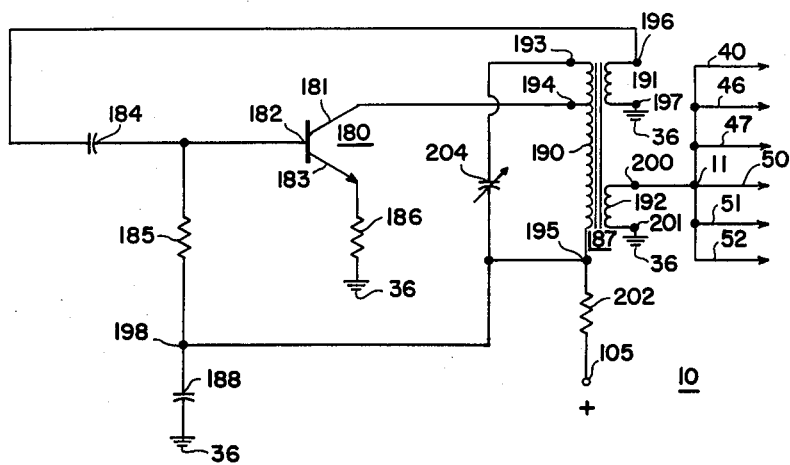
FIGURE 3 is a schematic diagram of an oscillator which might be used in FIGURES 1 and 2.

The oscillator 10 of FIGURE 3 has a transistor 180 having a collector 181, a base 182 and an emitter 183. Collector 181 of transistor 180 is connected through an intermediate tap 194 of a primary winding 190 of a transformer 187. The primary winding 190 further has end terminals 193 and 195. The emitter 183 of transistor 180 is connected to ground 36 through a resistor 186. Base 182 of transistor 180 is connected to a terminal 198 through resistor 185. Terminal 198 is connected to ground through a capacitor 188 to terminal 193 of transformer 187 through a variable capacitor 204 and is also directly connected to the terminal 195 of transformer 187. Terminal 195 of the primary winding 190 of transformer 187 is further connected to positive potential 105 through a resistor 202. Transformer 187 also has a secondary winding 192 with end terminals 201 and 200 and a secondary winding 191 with end terminals 196 and 197. Terminal 197 of the secondary winding 191 and terminal 201 of the secondary winding 192 are connected directly to ground 36. Terminal 196 of secondary winding 191 is connected to base 182 of transistor 180 through a capacitor 184 and terminal 200 of secondary winding 192 is connected to output terminal 11 of oscillator 10.

Figure 4:
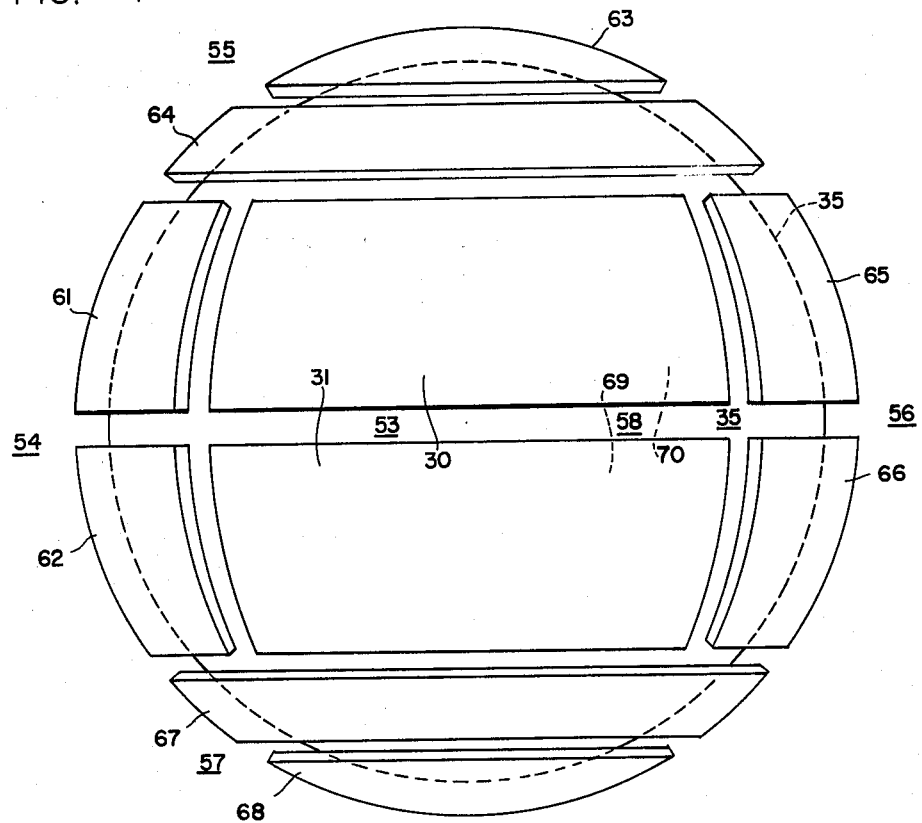
FIGURE 4 shows one possible arrangement of the rotor supporting electrodes.

Referring now to FIGURE 4 a typical configuration of electrodes surrounding rotor 35 is depicted. All of the reference numerals used in FIGURE 4 are the same as those used in FIGURES 1 and 2 corresponding to the same parts. Electrodes 61 and 62 constitute an electrode pair 54. Electrodes 65 and 66 constitute an electrode pair 56 positioned exactly opposite the electrode pair 54. Electrode pair 53 comprised of electrodes 31 and 30 is positioned diametrically opposite electrode pair 58 comprised of electrodes 69 and 70. Similarly electrode pair 55 including electrodes 63 and 64 is diametrically opposed to electrode pair 57 comprised of electrodes 67 and 68. The net force on the rotor due to electrostatic forces between electrode pair 55 and the rotor 35 and electrode pair 57 and the rotor 35 acts along the axis of electrode pairs 55 and 57 through the center of the rotor 35. Similarly the net force produced by the electrostatic forces between electrode pair 56 and rotor 35 and electrode pair 54 and rotor 35 acts along the axis of electrode pairs 54 and 56 through the center of the rotor. In the same manner the net force due to the electrostatic forces between electrode pair 53 and rotor 35 and electrode pair 58 and rotor 35 acts along the axis of electrode pairs 53 and 58 through the center of rotor 35. As it can be seen the forces due to the six pairs of electrodes act along three mutually orthogonal axes, x, y, and z, shown in FIGURE 5.

Operation

Figure 6:
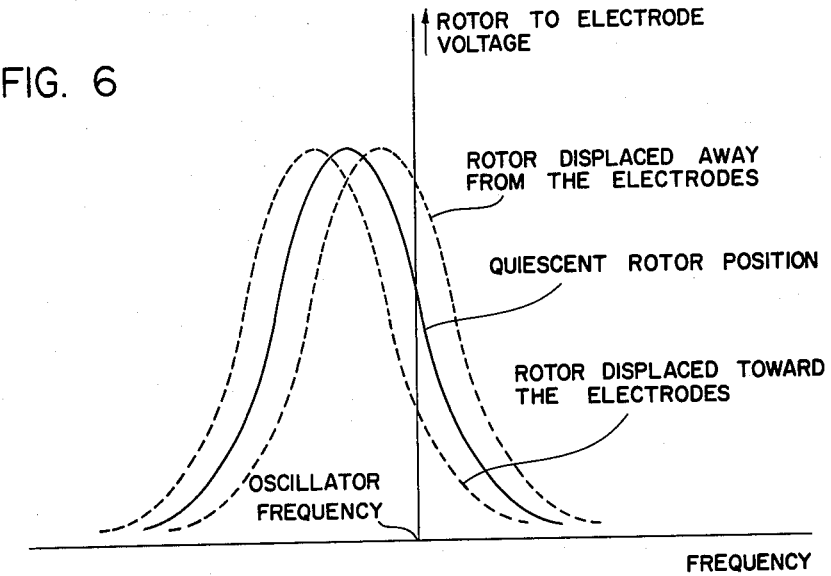
FIGURE 6 shows the resonance curve of the L-C loop including the rotor in series with the transformer winding for the different positions of the rotor.
Figure 7:
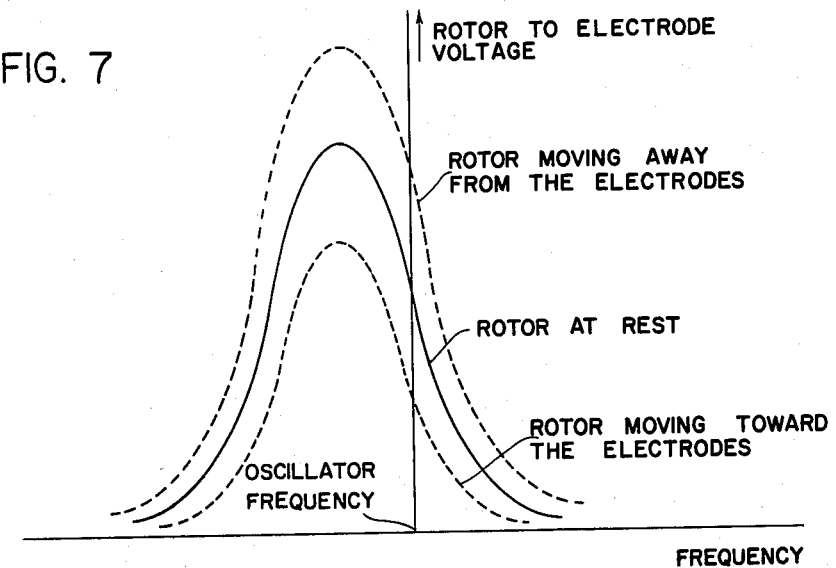
FIGURE 7 shows the resonance curve of the L-C loop for different displacement rate of the rotor.

In FIGURES 1 and 2 rotor 35 is part of an L-C tuned circuit 59 with a high Q. A typical frequency response curve or resonance curve for such an L-C circuit is shown in FIGURES 6 and 7. It can be seen that any change in driving frequency or a shift of the response curve along the frequency axis will cause variation in the rotor to electrode voltage and therefore will correspondingly vary the forces between the rotor and the electrodes. In the rotor support system shown in FIGURE 2 the operating frequency of oscillator 10 providing the input signal to the variable gain amplifier 31 is constant and the rotor restoring forces are derived from the shifting of the L-C resonance curve along the frequency curve, increasing the force if the resonant frequency becomes more tuned to the oscillator frequency, and decreasing the force if the circuit is further detuned. For the circuit to function properly the frequency of oscillator 10 should be somewhat higher than the resonant frequency of the tuned L-C circuit 59. The optimum condition is to have oscillator frequency about one-half bandwidth above the resonance frequency at the condition when the rotor is positioned in the center of the electrode cavity. The slope of the resonance curve is highest at that point, therefore allowing maximum changes in forces per rotor displacement and providing stiffer suspension. It is important that the operating point exists on the portion of the resonance curve with negative slope and at no time during the operation of the suspension system should the resonant frequency of L-C circuit 59 be higher than the frequency of signal oscillator 10 since that condition would place the operating point on the positive slope of the curve and precipitate the collapse of the rotor suspension.

In FIGURE 1 oscillator 10 is providing a constant frequency, constant magnitude output signal which is fed by conducting means 11 to a variable gain amplifier 12. The variable gain amplifier 12 can be any one of the standard amplifiers well known to those skilled in the art, one possible embodiment being illustrated in FIGURE 2. In variable gain amplifier 12 the signal is amplified and impressed on primary winding 17 of transformer 16 between terminals 14 and 15. The primary winding 17 of transformer 16 energizes the secondary winding 20 which is part of resonance loop 59 comprised of secondary winding 20 of transformer 16 in series with primary winding 24 of transformer 23 and the variable capacitive reactance comprised of electrodes 30 and 31 together with rotor 35.

The resonant frequency of L-C tuned circuit 59 and the frequency of the oscillator 10 are adjusted so that the frequency of the oscillator 10 is higher than the resonant frequency by about one-half bandwidth of the resonance curve when the rotor is in the desired position. This is shown in FIGURE 6 by the curve labeled "quiescent rotor position."

The resonance frequency $\omega_R$ follows the well known relationship of $$\omega_R = \frac{K}{\sqrt{LC}}$$

where K is a constant and L and C are the total values of inductance and capacitance in the circuit. In case here the inductance L is also a constant and the frequency is seen to vary only with the change in capacitance due to rotor movement. If the rotor moves toward the electrodes, the capacitance of the electrode-rotor combination increases and the resonance frequency of L-C network 59 decreases, shifting the resonant curve along the frequency axis away from the oscillator frequency, thus decreasing the rotor-to-electrode voltages. Since the forces are proportional to the voltages, this effective decreases the rotor-to-electrode forces. This is illustrated in FIGURE 6.

Obviously, if the rotor moves away from the electrodes, the electrode-to-rotor capacitance decreases and the resonant frequency increases, shifting the resonance curve toward the oscillator frequency and increasing the rotor-to-electrode voltages and corresponding forces.

For the purpose of illustration only one channel of electronics is shown here. An identical channel is acting on the rotor at a position diametrically opposed to electrodes 30 and 31 with electrodes 68 and 69 as shown in FIGURE 4, so that as the rotor moves away from the electrodes on one side, it moves toward the electrodes on the other side. The force increases on the side with increasing rotor-to-electrode gap and decreases on the side with decreasing gap thus tending to maintain the rotor suspended at a position where the forces are balanced.

Figure 5:
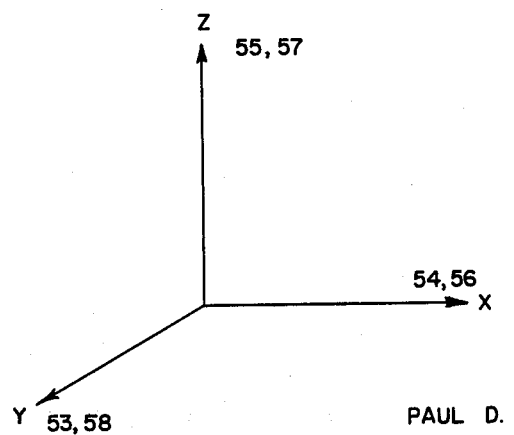
FIGURE 5 is a set of orthogonal axes showing the direction of forces in an electrostatic support system using the electrode configuration of FIGURE 4.

One possible arrangement for stable suspension is to have the electrode configuration shown in FIGURE 4 with six pairs of electrodes producing suspension forces along three mutually orthogonal axes as shown in FIGURE 5.

In FIGURE 1 a signal proportional to the rotor-to-electrode voltage is impressed on primary winding 24 of transformer 23, energizing the secondary winding 25 of transformer 23. The signal across secondary winding 25 of transformer 23 is fed into a compensating network 34 by means of conductors 32 and 33. The compensating network 35 includes means for differentiating the signal received from secondary winding 25 of transformer 24 and providing a signal proportional to the rate of change in the rotor-to-electrode voltage, feeding this signal into variable gain amplifier 12 to control the gain of said amplifier.

If rotor 35 is moving toward the electrodes 30 and 31, the signal from the compensating network 34 acts to decrease the gain of amplifier 12 and thus reduce the attractive force between the rotor 35 and electrodes 30 and 31. If the rotor 35 is moving away from the electrodes 30 and 31, the signal from the compensating network 34 acts to increase the gain of amplifier 12 and correspondingly increase the forces. This is shown in FIGURE 7 of the drawings. The amount of decrease or increase in gain depends upon the relative velocity of the rotor. The effect of this action is to slow down the rotor or in other words to provide damping.

Referring now to FIGURE 2, a suspension channel similar to FIGURE 1 is shown, but in much greater detail. In addition there is shown a block diagram of five additional channels which are identical to the channel 39 and are all receiving the signal from oscillator 10. Since all channels work in the same manner the operational description of one will suffice and amply explain the operation of any system employing more than one channel. Six channels are illustrated here to accommodate the electrode configuration of FIGURE 4, however, only two channels are necessary to balance the forces along any one axis.

Channel 39 receives a signal of constant frequency and magnitude from oscillator 10 by means of conductor 40. The signal is fed into emitter follower stage 88 of the amplifier 39 at the input terminal 71. The main purpose of the emitter follower stage is to isolate the suspension channel from other channels or any external circuitry. Transistor 80 of the emitter follower stage is D.C. biased from a positive potential through resistors 79 and 76 and has a portion of the signal from the oscillator applied between the base 82 of transistor 80 and the ground 36. Capacitor 75 readily allows the A.C. signal to pass through and is only present to stabilize the D.C. bias voltages and prevent grounding of the base 82. The output signal of the stage 88 appears across primary winding 85 of transformer 84. The signal on the primary winding 85 induces a signal on the secondary winding 86 and provides an input signal for the push-pull amplifier stage 108 having transistor 95 and 101 connected in a common emitter configuration. The theory of operation of the push-pull amplifier is well known to those skilled in the art and will not be given here, however, a reference can be made to Fitchen, F. C., Transistor Circuit Analysis and Design, D. Van Nostrand Company, Inc., Princeton, N.J., 1960.

The output signal of push-pull stage 108 appears across primary winding 111 of transformer 110 and induces a signal on secondary winding 112. The signal across secondary winding 112 of transformer 110 provides the input signal for the push-pull amplifier stage 118 similar to push-pull stage 108. The output signal of push-pull amplifier 118 appears across primary winding 17 of transformer 16 and induces a signal in the secondary winding 20 of transformer 16. The signal across secondary winding 20 of transformer 16 energizes tuned L-C loop 59, the operation of which has been explained in detail with reference to FIGURE 1. The inclusion of resistor 29 is solely for the purpose of monitoring and is not necessary for the operation of the circuit. Resistor 28 connected from terminal 21 of the secondary winding 20 of transformer 16 is included to prevent a buildup of static charge on the electrodes 30 and 31 and has a large value. It is not, however, essential to the operation of this circuit.

The voltage which appears on the primary winding 24 of transformer 23 is proportional to the potential between the electrodes 30 and 31 and rotor 35. In addition to a voltage varying at a constant frequency associated with the frequency of the oscillator 10, there is a variation in the voltage amplitude due to the motion of the rotor with respect to the electrodes, the rate of variation depending upon the speed of the rotor. The direction of variation in voltage depends upon the direction of the displacement of rotor 35. When rotor 35 is moving toward electrodes 30 and 31 the magnitude of the voltage will decrease, and conversely when rotor 35 is moving away from the electrodes 30 and 31 the magnitude of the voltage increases. The changes due to the motion of the rotor are slow compared to the frequency of the oscillator.

The signal from the secondary winding 25 of transformer 23 is fed to anode side 131 of diode 130, where the signal is rectified and sent from the cathode 132 of diode 130 to the input terminal 133 of filter 138. At output 134 of filter 138 a smooth D.C. signal whose amplitude varies only with the motion of rotor 35 is shown, the rate of variation depending upon the instantaneous speed of rotor 35. The series combination of resistors 141 and 142 provides the D.C. path for the signal and also acts as a voltage divider. A portion of the signal is tapped from terminal 43 common to both resistors 141 and 142 fed through capacitor 144 to the center tap 91 of transformer 84. In capacitor 144 the signal is differentiated and the output signal of the capacitor 144 appearing at the center tap of transformer 84 is proportional only to the rate of rotor displacement. Motion of rotor 35 towards electrodes 30 and 31 will produce a negative signal at center tap 91 of the secondary winding 86 of transformer 84 and will decrease the bias potential on the base 97 of transistor 95 and base 103 of transistor 101. This in turn will reduce the conduction of current from positive potential 105 through primary winding 111 of transformer 110 and transistors 95 and 101 to ground 36 through resistor 94, thereby temporarily reducing the gain of amplifier stage 108. The result of the reduction in gain is a decrease in the support voltage and the corresponding decrease in the attractive force between the rotor 35 and electrodes 30 and 31, tending to slow down rotor 35.

Motion of rotor 35 away from electrode pair 53 produces a positive signal at the center tap 97 of the secondary winding 86 of transformer 84 and causes an increase in the bias potential at base 97 of transistor 95 and base 103 of transistor 101. This in turn will increase the conduction of the transistors and increase the gain of the push-pull amplifier stage 108. The final result is an increase in voltage and corresponding attractive force between the rotor 35 and electrodes 30 and 31, tending to slow down the motion of rotor 35 away from electrodes 30 and 31. As can be seen the compensating network is providing effective damping.

It is understood that the specific embodiment of my invention shown is only for the purpose of illustration, and that my invention is limited only by the scope of the appended claims.

I claim:

1. A free gyro system including a gyroscope having an electrically conductive rotor and a plurality of rotor supporting electrodes generally disposed about and adjacent said rotor, and means for applying electrostatic supporting potentials between said electrodes and said rotor so as to support said rotor free of contact with said electrodes, said potential applying means comprising:
   means including an oscillator means and a variable gain amplifier means operatively connected to said electrodes for establishing supporting potentials between said electrodes and said rotor;
   inductive means including a transformer having a primary winding means and a secondary winding means inductively coupled to said primary winding means and means connecting said secondary winding means to said electrodes;
   and means including said primary winding means and compensating network means connected to said amplifier means to vary the gain of said amplifier means as a function of the rate of change of electrode voltage.

2. An inertial system including an electrically conductive sphere and a plurality of sphere supporting electrodes generally disposed about and adjacent said sphere, and means for applying electrostatic supporting potentials between said electrodes and said sphere so as to support said sphere free of contact with said electrodes, said potential applying means comprising:
   means including an oscillator means and a variable gain amplifier means operatively connected to said electrodes for establishing supporting potentials between said electrodes and said sphere;
   inductive means including a transformer having a primary winding means and a secondary winding means inductively coupled to said primary winding means and means connecting said secondary winding means to said electrodes;
   and means including said primary winding means and compensating network means comprised of rectifying means, filtering means and differentiating means connected to said amplifier means to vary the gain of said amplifier means in proportion to the rate of change of electrode voltage.

3. An inertial system including an electrically conductive member and a plurality of member supporting electrodes generally disposed about and adjacent said member, and means for applying electrostatic supporting potentials between said electrodes and said member so as to support said member free of contact with said electrodes, said potential applying means comprising:
   means including an oscillator means and a variable gain amplifier means operatively connected to said electrodes for establishing supporting potentials between said electrodes and said member;
   inductive means including a transformer having a primary winding means and a secondary winding means inductively coupled to said primary winding means, means connecting said secondary winding means to said electrodes;
   and means including said primary winding means and compensating network means comprised of rectifying means, filtering means and differentiating means connected to said amplifier means to vary the gain of said amplifier means in proportion to the rate of charge of electrode voltage.

4. An inertial system including an electrically conductive member and a plurality of member supporting electrodes generally disposed about and adjacent said member, and means for applying electrostatic supporting potentials between said electrodes and said member so as to support said member free of contact with said electrodes, said potential applying means comprising:
   means including an oscillator means and a variable gain amplifier means operatively connected to said electrodes for establishing supporting potentials between said electrodes and said member;
   and means including means for detecting said supporting potentials connected to said amplifier means and to said electrodes to vary the gain of said amplifier means as a function of the rate of change of said supporting potentials.

5. An inertial system including an electrically conductive member and a plurality of member supporting electrodes generally disposed about and adjacent said member, and means for applying electrostatic supporting potentials between said electrodes and said member so as to support said member free of contact with said electrodes, said potential applying means comprising:
   means including an oscillator means and a variable gain amplifier means operatively connected to said electrodes for establishing supporting potentials between said electrodes and said member;
   and means including compensating network means connected to said amplifier means and to said electrodes to vary the gain of said amplifier means as a function of the rate of change of said electrode potential.

6. An inertial system including an electrically conductive member and a plurality of member supporting electrodes generally disposed about and adjacent said member, and means for applying electrostatic supporting potentials between said electrodes and said member so as to support said member free of contact with said electrodes, said potential applying means comprising:
   means including an oscillator means and a variable gain amplifier means operatively connected to said electrodes for establishing supporting potentials between said electrodes and said member;
   and means including compensating network means connected to said amplifier means and to said electrodes to vary the gain of said amplifier means as a function of the rate of change of member position.

7. A free gyro system including a gyroscope having an electrically conductive rotor and a plurality of rotor supporting electrodes generally disposed about and adjacent said rotor, and means for applying electrostatic supporting potentials between said electrodes and said rotor so as to support said rotor free of contact with said electrodes, said potential applying means comprising:
   inductive means including a transformer having primary winding means, secondary winding means, and additional winding means coupled to said secondary winding means;
   means connecting said secondary winding means to said electrodes, said inductive means and the capacitance between said rotor and said electrodes forming a resonant L-C circuit whose natural resonant frequency varies with the position of said rotor;

means including an oscillator means and a variable gain amplifier means operatively connected to said primary means for energizing said resonant circuit with a forcing frequency one-half bandwidth higher than the natural resonant frequency of said L-C circuit when said rotor is equally spaced from said electrodes;

and means including said additional winding means connected to said amplifier means to vary the gain of said amplifier means in proportion to the rate of change of said potential.

8. An inertial system including an electrically conductive sphere and a plurality of sphere supporting electrodes generally disposed about and adjacent said sphere, and means for applying electrostatic supporting potentials between said electrodes and said sphere so as to support said sphere free of contact with said electrodes, said potential applying means comprising:

inductive means including a transformer having primary winding means, secondary winding means, and additional winding means in circuit with said secondary winding means;

means connecting said secondary winding means to said electrodes, said inductive means and the capacitance between said sphere and said electrodes forming a resonant L-C circuit whose natural resonant frequency varies with the position of said sphere;

means including an oscillator means and a variable gain amplifier means operatively connected to said primary means for energizing said resonant circuit with a forcing frequency higher than the natural resonant frequency of said L-C circuit when said sphere is equally spaced from said electrodes;

and means including said additional winding means connected to said amplifier means to vary the gain of said amplifier means as a function of the rate of change of said electrode potential.

9. An inertial system including an electrically conductive member and a support for said member including a plurality of supporting electrodes generally disposed about and adjacent said member, and means for applying electrostatic supporting potentials between said electrodes and said member so as to support said member free of contact with said electrodes, said potential applying means comprising:

inductive means including first winding means and second winding means in circuit with said first winding means;

means connecting said winding means to said electrodes, said winding means and the capacitance between said member and said electrodes forming a resonant L-C circuit whose natural resonant frequency varies with position of said member;

means including an oscillator means and a variable gain amplifier means connected to said first means operatively for energizing said resonant circuit with a forcing frequency higher than the natural resonant frequency of said L-C circuit when said member is equally spaced from said electrodes;

and means including said second winding means connected to said amplifier means to vary the gain of said amplifier means as a function of the rate of change of said electrode potential.

References Cited by the Examiner

UNITED STATES PATENTS 3,003,356 10/1961 Nordsieck _____ 74—5
3,098,679 7/1963 De Boice _____ 308—10

MILTON KAUFMAN, *Primary Examiner.*

MILTON O. HIRSHFIELD, BROUGHTON G. DURHAM, *Examiners.*

C. E. ROHRER, P. W. SULLIVAN, *Assistant Examiners.*